UNITED STATES PATENT OFFICE.

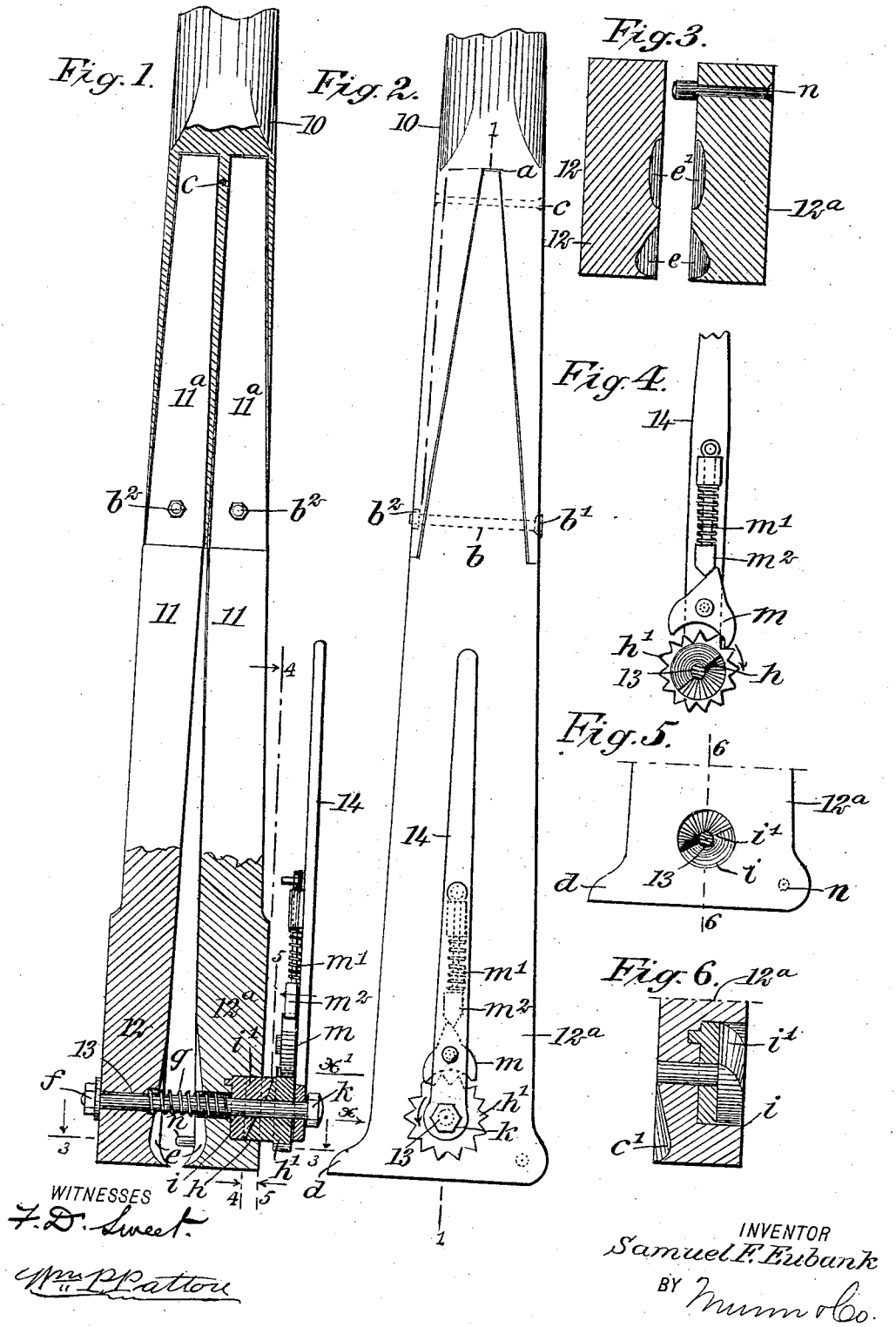

SAMUEL F. EUBANK, OF COLUMBIA, KENTUCKY, ASSIGNOR OF ONE-THIRD TO CHARLES S. HARRIS AND JAMES GARNETT, OF COLUMBIA, KENTUCKY.

IMPLEMENT FOR EXTRACTING SPIKES AND BOLTS.

No. 870,422.  Specification of Letters Patent.  Patented Nov. 5, 1907.

Application filed April 12, 1907. Serial No. 367,762.

*To all whom it may concern:*

Be it known that I, SAMUEL F. EUBANK, a citizen of the United States, and a resident of Columbia, in the county of Adair and State of Kentucky, have invented a new and Improved Implement for Extracting Spikes and Bolts, of which the following is a full, clear, and exact description.

The purpose of this invention is to provide novel details of construction for a nail and bolt extractor which comprise a handle lever, jaws pivoted on the handle lever, a supplementary lever, a bolt passing transversely through the jaws near gripping edges thereon, a cam and ratchet wheel device operable by the supplementary lever for compressing the jaws, and a spring pressed by the jaws when said jaws are compressed and expanding them when they are released.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a partly sectional front elevation of the implement substantially on the line 1—1 in Fig. 2 seen in direction of arrow $x$ in said figure; Fig. 2 is a side elevation of the same, seen in direction of the arrow $x$ in Fig. 1, showing details adjusted for gripping an object; Fig. 3 is an enlarged sectional plan view of the gripping jaws, taken substantially on the line 3—3 in Fig. 1; Fig. 4 is a detached side view of details partly in section, substantially on the line 4—4 in Fig. 1, seen in direction of adjacent arrows; Fig. 5 is a detached side view of the outer side of one gripping jaw, a cam thereon, and a transverse section of a shaft, substantially on the line 5—5 in Fig. 1, seen in direction of adjacent arrows, and Fig. 6 is a transverse sectional view, substantially on the line 6—6 in Fig. 5.

The handle bar 10 of the implement that is shown broken away at one end, in complete form, is of a suitable length for effective service as a lever. In the opposite end portion of the lever 10, a preferably V-shaped slot $a$ is formed, the slot being central. Two similar extension members 11 of the lever 10, have corresponding end portions $11^a$ tapered so as to fit loosely into the slot $a$, as indicated in Fig. 2, and as appears in dotted lines in Fig. 1, said tongues $11^a$ are also tapered edgewise on remaining sides, two of which sides are disposed oppositely and adjacent to each other when the tongues are fully inserted within the slot $a$. The tongues $11^a$ are pivoted in the slot $a$ by two cross bolts $b$, which have counter-sunk heads $b'$ and nuts $b^2$ on their opposite threaded ends, said nuts being embedded in counter-sinks formed at the outer ends of the perforations holding the bolts $b$. A stop pin or bolt $c$ is fixed in the walls that define the slot $a$ and, passing between adjacent sides of the tongues, serves to limit their rocking movement toward each other.

Upon lower portions of the members 11, gripping jaws 12, $12^a$ are formed, each jaw having a forwardly projected toe $d$ thereon, and in the inner side of each jaw two cavities $e$, $e'$ are formed that are disposed oppositely in pairs, the cavities $e$, $e$, being adjacent to the toes $d$, and the other cavities $e'$, rearward of the cavity $e$, all said cavities producing sharp lower edges on the jaws 12, $12^a$ for biting engagement with a spike or bolt inserted between them. The jaws 12, $12^a$ are perforated oppositely a short distance above the lower edges thereof and about at their centers of width, these perforations receiving a clamping bolt 13, which is loosely fitted therein, has a head $k$ on one end and a nut $f$ screwed upon the opposite end.

Upon the clamping bolt, a coiled spring $g$ is mounted, which normally has contact at its ends upon inner sides of the jaws 12, $12^a$. Upon one end of the clamping bolt 13 that projects exterior of the jaw $12^a$, a cam disk $h$ and a ratchet wheel $h'$ are together loosely mounted thereon. The disk and ratchet wheel have lateral contact and may be secured together or be formed integral with each other as indicated in the drawings.

In the adjacent face of the jaw $12^a$ that is counterbored as shown at $i$ in Figs. 1, 5 and 6, a cam swell $i'$ is formed or secured, which is the counterpart of the cam swell on the disk $h$; preferably this cam is made as a separate piece and is removably secured in the counterbore $i$.

Upon the clamping bolt 13, outside of the ratchet wheel $h'$, a supplementary lever 14 is mounted by an insertion of the bolt through a lateral perforation in said lever near its lower extremity, and the latter is held from displacement by the head $k$.

The cam swell on the disk $h$ and the cam swell $i'$ on the jaw $12^a$ are so relatively arranged, that upon giving the disk $h$ a partial rotation in direction of the curved arrow in Fig. 2, the high portions of the cam swells will ride upon each other, which will pull upon the bolt 13, correspondingly compress the jaws 12, $12^a$ toward each other, and close the spring $g$.

Upon the lever 14, above the ratchet wheel $h'$, a pawl $m$ is pivoted, it being of a well-known type having two spaced toes, and the teeth on the ratchet wheel are so shaped that the pawl may be rocked into engagement therewith and introduce either toe of the pawl between the teeth as shown clearly in Figs. 2 and 4 that respectively represent opposite adjustments of the pawl. The pawl $m$ is engaged by a presser block $m^2$ that in turn is pressed by a spring $m'$ and as shown, the spring pressed contact of the block with the pawl will enforce the engagement of either toe thereon with the teeth of the ratchet wheel.

It will be observed that when the pawl $m$ is adjusted as shown in Fig. 2, the upward rocking movement of the supplementary lever 14, will turn the ratchet wheel $h'$ in direction of the curved arrow in said figure, and cause the swell on the cam $h$ to engage with the mating swell $i'$ and correspondingly close the jaws 12, 12$^a$. Now by a change in adjustment of the pawl $m$ so as to engage the other toe thereof with the ratchet wheel $h'$, the cam swells, when the lever 14 is rocked forwardly, will be adjusted together at their lowest points, which will permit an expansion of the spring $g$ and a consequent divergence of the gripping edges on the jaws 12, 12$^a$.

Rearward of the clamping bolt 13, an abutment stud $n$ is projected from one jaw toward the other one; as shown, the stud is carried by the jaw 12$^a$ and at its free end nearly contacts with the inner side of the jaw 12.

In using the implement for pulling a spike which has been fully driven into a cross tie for a railroad, the supplementary lever 14 is rocked forwardly and downwardly, thus permitting the jaws 12, 12$^a$ to open to their limit, due to stress of the spring $g$, it being understood that the pawl $m$ has been adjusted as shown in Fig. 4. The handle bar or lever 10 is now held perpendicularly above a spike that is to be drawn from a cross tie, and the jaws 12, 12$^a$ are caused to loosely embrace opposite sides of the head of the spike. The pawl $m$ is now rocked into the position shown in Fig. 2 and the lever 14 pressed upward, which will actuate the cams and correspondingly close the gripping edges $e$, $e$ of the jaws 12, 12$^a$ that are thus embedded in the head of the spike, and it will be obvious that the contact of the stud $n$ with the jaw 12 will enforce such an embedment of the gripping edges $e$. The handle lever 10 is now rocked forward, which will adapt the toes $d$ on the jaws 12, 12$^a$ to serve as fulcrums, and by a rocking movement of the handle lever 10 back and forth thereon, the head of the spike will be raised somewhat and the body thereof loosened. The supplementary lever 14 is now rocked forwardly after a change in adjustment of the pawl $m$, as before explained, which will release the jaws from the head of the spike. A new hold may now be taken on the spike body and after closure of the jaws 12, 12$^a$ by means hereinbefore described, the lever 10, upon rocking it forward will elevate the spike free from the cross tie.

The improvement may be utilized for drawing bolts of all kinds that have been driven into or through timbers, and the use of the implement will not injure either the bolt, spike or nail it is employed to withdraw from material it has been driven into.

Having fully described my invention, I claim as new and desire to secure by Letters Patent:

1. The combination with a handle lever having a slot in one end, two gripping jaws having extended portions that are pivoted side by side in the slot, so as to rock toward and from each other, and a spring between the jaws pressing thereon, of a supplementary lever, means for supporting said lever at one side of the jaws, and two opposed cams between the levers that are controlled by the supplementary lever.

2. The combination with a handle lever having a slot in one end, two gripping jaws having extended portions that are pivoted on separate bolts side by side in the slot so as to rock toward and from each other, and an abutment pin passed through the slot between inserted ends of the extension portions, of a supplementary lever, a clamping bolt loosely inserted through the jaws whereon the supplementary lever is mounted, and means controlled by said lever for moving the jaws.

3. The combination with a handle lever slotted in one end, two similar extension bars having tongues on one end which occupy the slot and are pivoted so as to rock therein, and two gripping jaws on the ends of said extension bars, of a bolt passed through the jaws near their gripping edges, a spring mounted on said bolt normally pressing the jaws apart, and means carried by the bolt, adapted for compressing the jaws against stress of the spring.

4. The combination with a handle lever, two extension bars pivoted at one end of each bar upon the same end of the handle lever, a gripping jaw on the opposite end of each extension bar, said bars each having a toe extended forwardly on the gripping jaw thereof, a fulcrum stud projected from one gripping jaw for contact with the other gripping jaw, a clamping bolt passing through opposite perforations in the gripping jaws near their cutting edges, and having a head on one end and a nut on the other end, of an expansible spring on the bolt pressing upon the jaws, a cam swell fixed on one gripping jaw through which the clamping bolt passes, a supplementary lever rockable on the bolt near its head, a ratchet wheel mounted upon the clamping bolt, a spring pressed pawl engaging teeth of said ratchet wheel, and a cam swell on the ratchet wheel having contact with the mating cam on the gripping jaw.

In testimony whereof I have signed my name to this specification in the presence of two subscribing witnesses.

SAMUEL F. EUBANK.

Witnesses:
TIM CRAVENS,
ROLLIN HURT.